United States Patent
Lu et al.

(10) Patent No.: US 9,654,569 B2
(45) Date of Patent: May 16, 2017

(54) INTERNAL NETWORK SYSTEM ON A LOCAL AREA NETWORK AND METHOD OF COMMUNICATION IN AN INTERNAL NETWORK SYSTEM ON A LOCAL AREA NETWORK

(71) Applicant: Synology Incorporated, Taipei (TW)

(72) Inventors: Tung-Hsuan Lu, Taipei (TW); Ai-Mi Chen, Keelung (TW)

(73) Assignee: Synology Incorporated, Taipei (TW)

( * ) Notice: Subject to any disclaimer, the term of this patent is extended or adjusted under 35 U.S.C. 154(b) by 333 days.

(21) Appl. No.: 13/899,585

(22) Filed: May 22, 2013

(65) Prior Publication Data

US 2013/0318190 A1    Nov. 28, 2013

Related U.S. Application Data

(60) Provisional application No. 61/651,526, filed on May 24, 2012.

(51) Int. Cl.
*G06F 15/173* (2006.01)
*H04L 29/08* (2006.01)
*H04L 29/06* (2006.01)
*H04L 29/12* (2006.01)

(52) U.S. Cl.
CPC ............ *H04L 67/16* (2013.01); *H04L 69/164* (2013.01); *H04L 61/103* (2013.01)

(58) Field of Classification Search
CPC combination set(s) only.
See application file for complete search history.

(56) References Cited

U.S. PATENT DOCUMENTS

| | | | |
|---|---|---|---|
| 2002/0027569 A1* | 3/2002 | Manni et al. | 345/764 |
| 2002/0035621 A1* | 3/2002 | Zintel et al. | 709/220 |
| 2002/0083143 A1* | 6/2002 | Cheng | 709/208 |
| 2008/0120408 A1* | 5/2008 | Kim | 709/224 |
| 2009/0265540 A1 | 10/2009 | Jin | |
| 2010/0217837 A1* | 8/2010 | Ansari | G06Q 30/04 709/218 |
| 2012/0079080 A1* | 3/2012 | Pishevar | A63F 13/12 709/220 |
| 2014/0379888 A1* | 12/2014 | Choi et al. | 709/223 |

FOREIGN PATENT DOCUMENTS

GB          2 412 198 A       9/2005

* cited by examiner

*Primary Examiner* — Scott B Christensen
(74) *Attorney, Agent, or Firm* — Winston Hsu; Scott Margo

(57) ABSTRACT

A method of communication in an internal network system on a local area network is disclosed, where the internal network system includes a host. The method includes finding a first slave on the internal network system of the local area network through a predetermined tool built in an operating system; utilizing a first predefined protocol to search for a second slave; utilizing a second predefined protocol to respond information of the second slave; receiving the information of the second slave; and transmitting the information of the second slave to the host.

14 Claims, 8 Drawing Sheets

INTERNAL NETWORK SYSTEM ON A LOCAL AREA NETWORK AND METHOD OF COMMUNICATION IN AN INTERNAL NETWORK SYSTEM ON A LOCAL AREA NETWORK

CROSS REFERENCE TO RELATED APPLICATIONS

This application claims the benefit of U.S. Provisional Application No. 61/651,526, filed on May 24, 2012 and entitled "INTERNAL NETWORK SYSTEM ON A LOCAL AREA NETWORK AND METHOD OF COMMUNICATION IN AN INTERNAL NETWORK SYSTEM ON A LOCAL AREA NETWORK, " the contents of which are incorporated herein by reference.

BACKGROUND OF THE INVENTION

1. Field of the Invention

The present invention relates to an internal network system on a local area network and a method of communication in an internal network system on a local area network, and particularly to an internal network system on a local area network and a method of communication in an internal network system on a local area network that can not need any additional software to help a host to search for slaves located on the local area network.

2. Description of the Prior Art

Usually, in a small internal network environment (e.g. an office or home), only a host has a display to show information corresponding to other devices on the small internal network environment. That is to say, the other devices do not have display thereof. Therefore, a user needs to utilize the host to control the other devices, and utilizes the display of the host to show the information corresponding to other devices.

In the prior art, the user first needs to install additional software in the host except original software built in an operating system of the host. Thus, the host can utilize the additional software to find the other devices on the small internal network environment. That is to say, the host can utilize the additional software to build communication between the host and the other devices. After the host builds the communication between the host and the other devices, the user can control and monitor the other devices to execute predetermined operations through the host. However, because the user needs to install the additional software in the host, the prior art is not convenient and friendly for the user.

SUMMARY OF THE INVENTION

An embodiment provides a method of communication in an internal network system on a local area network, where the internal network system includes a host. The method includes finding a first slave on the internal network system of the local area network through a predetermined tool built in an operating system; utilizing a first predefined protocol to search for a second slave; utilizing a second predefined protocol to respond information of the second slave; receiving the information of the second slave; and transmitting the information of the second slave to the host.

Another embodiment provides an internal network system on a local area network. The internal network system includes a host. The host is used for finding a first slave on the internal network system of the local area network through a predetermined tool built in an operating system. The first slave utilizes a first predefined protocol to search for a second slave, the second slave utilizes a second predefined protocol to respond information of the second slave, and the first slave receives and transmits the information of the second slave to the host.

The present invention provides an internal network system on a local area network and a method of communication in an internal network system on a local area network. The internal network system and the method utilize a host not installed any additional software to find a search agent on the internal network system through a hostname. If the host can find one search agent on the internal network system, the search agent can help the host find other slaves on the internal network system. Therefore, compared to the prior art, because the host does not need any additional software installed for searching slaves on the internal network system except a web browser and original software built in an operating system of the host, the present invention is convenient and friendly for a user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
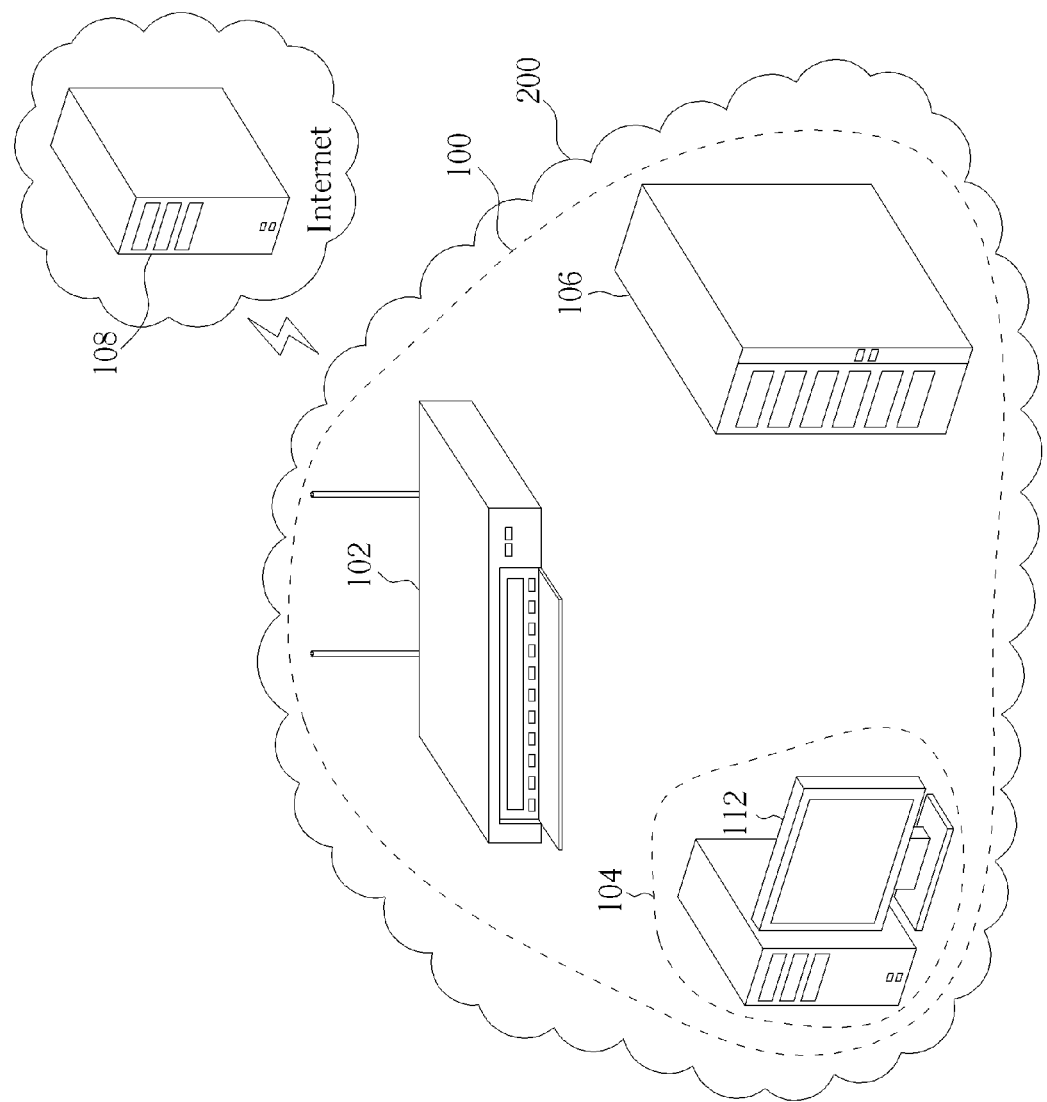
FIG. 1 is a diagram illustrating an internal network system on a local area network according to an embodiment.

Please refer to FIG. 1. FIG. 1 is a diagram illustrating an internal network system 100 on a local area network 200 according to an embodiment. As shown in FIG. 1, the internal network system 100 includes a router 102, a host 104, and a first slave 106, where the host 104 can connect to a predetermined server 108 on the Internet through the router 102, but the first slave 106 mayor may not connect to the Internet. It is noted that the host 104 does not need any additional software installed for searching the first slave 106 except a web browser and original software built in an operating system of the host 104. In addition, before the first slave 106 is shipped, the first slave 106 has a hostname (e.g. a Network Basic Input/Output System (NetBIOS) name), and the hostname of the first slave 106 can be mapped to an Internet Protocol (IP) address, where the hostname of the first slave 106 is stored in a memory (e.g. a flash memory) of the first slave 106. That is to say, the hostname of the first slave 106 has been set after the first slave 106 was fabricated. But the hostname of the first slave 106 is not limited to the NetBIOS name.

Figure 2:
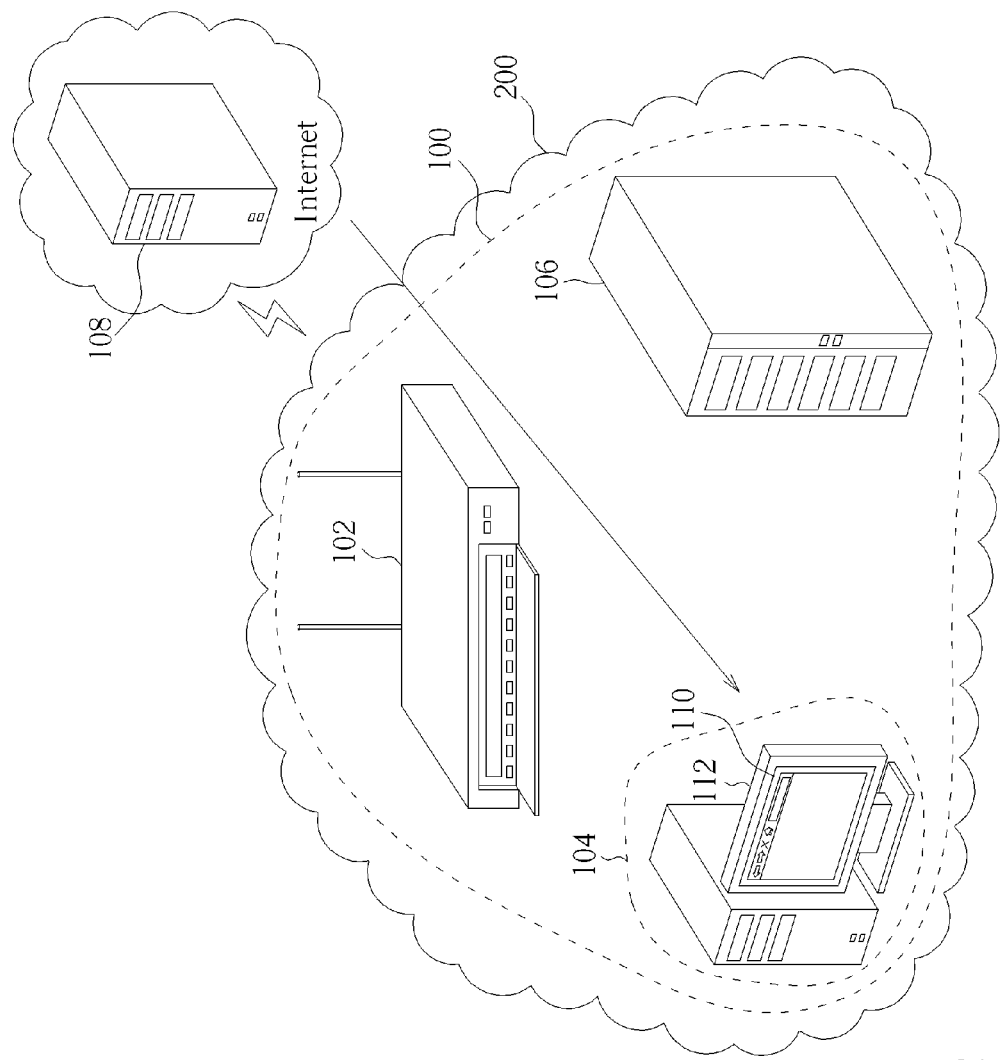
FIG. 2 is a diagram illustrating the host obtaining the window box from the predetermined server.

When the host 104 starts to find the first slave 106 on the internal network system 100, the host 104 first utilizes the web browser of the host 104 to connect to the predetermined server 108 on the Internet through the router 102. Meanwhile, the web browser of the host 104 can obtain a window box 110 from the predetermined server 108, so a user can view the window box 110 displayed on a display 112 of the host 104. Meanwhile, the user can not view any information displayed on the window box 110 (as shown in FIG. 2).

Figure 3:
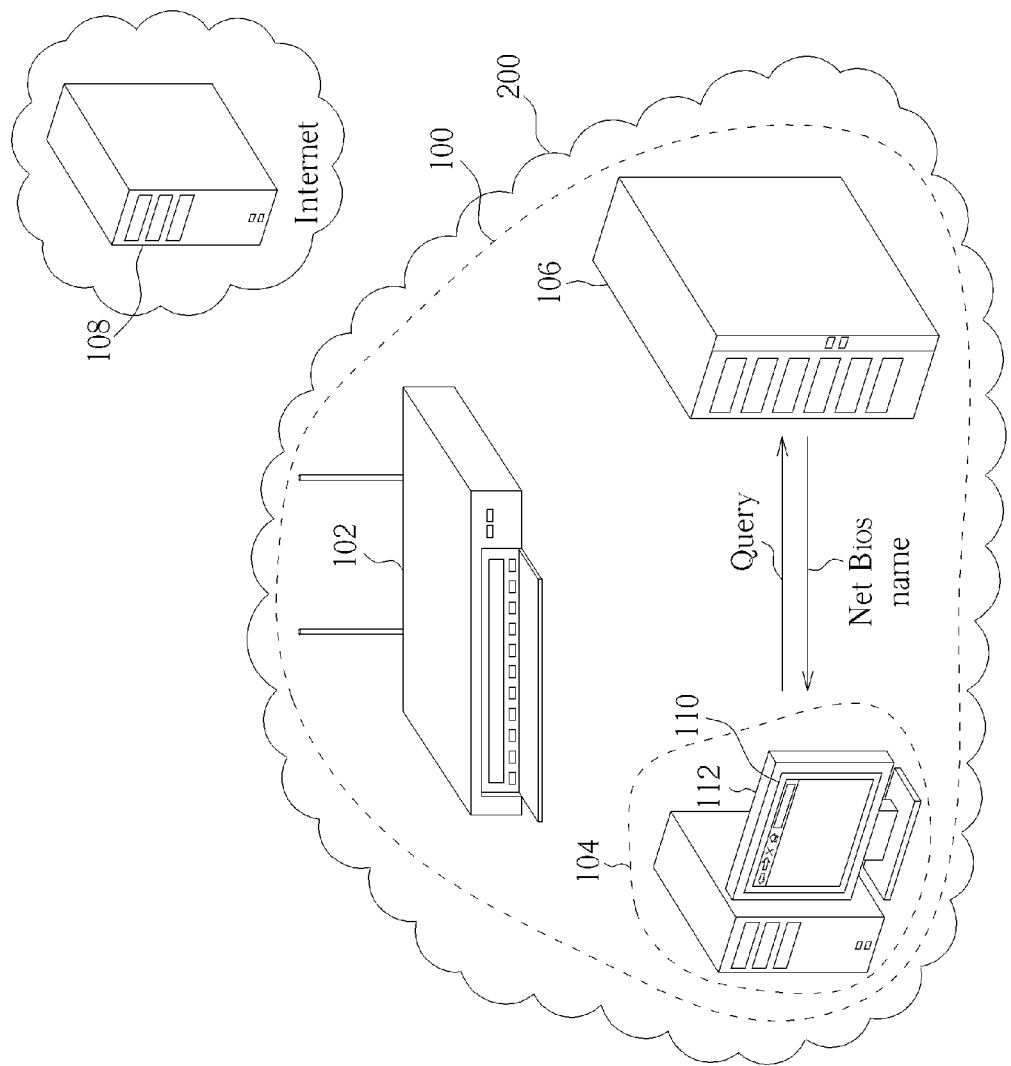
FIG. 3 is a diagram illustrating the host querying the slave on the internal network system through the hostname.

After the host 104 obtains the window box 110, the host 104 can utilize cross site Asynchronous JavaScript and XML (Ajax) built in an operating system of the host 104 to query the first slave 106 on the internal network system 100 through the hostname (e.g. the NetBIOS name) of the first slave 106, where the operating system can include Windows, MAC, Linux, iPhone OS, or Android. That is to say, the host 104 can utilize the window box 110 to establish communication with the predetermined server 108 and the first slave 106. Therefore, the first slave 106 is set to be a search agent by the host 104 (as shown in FIG. 3). If there are a plurality of slaves (the plurality of slaves have the same hostname) existing on the internal network system 100, the host 104 can still only set one (e.g. the first slave 106) of the plurality of slaves to be a search agent.

Figure 4:
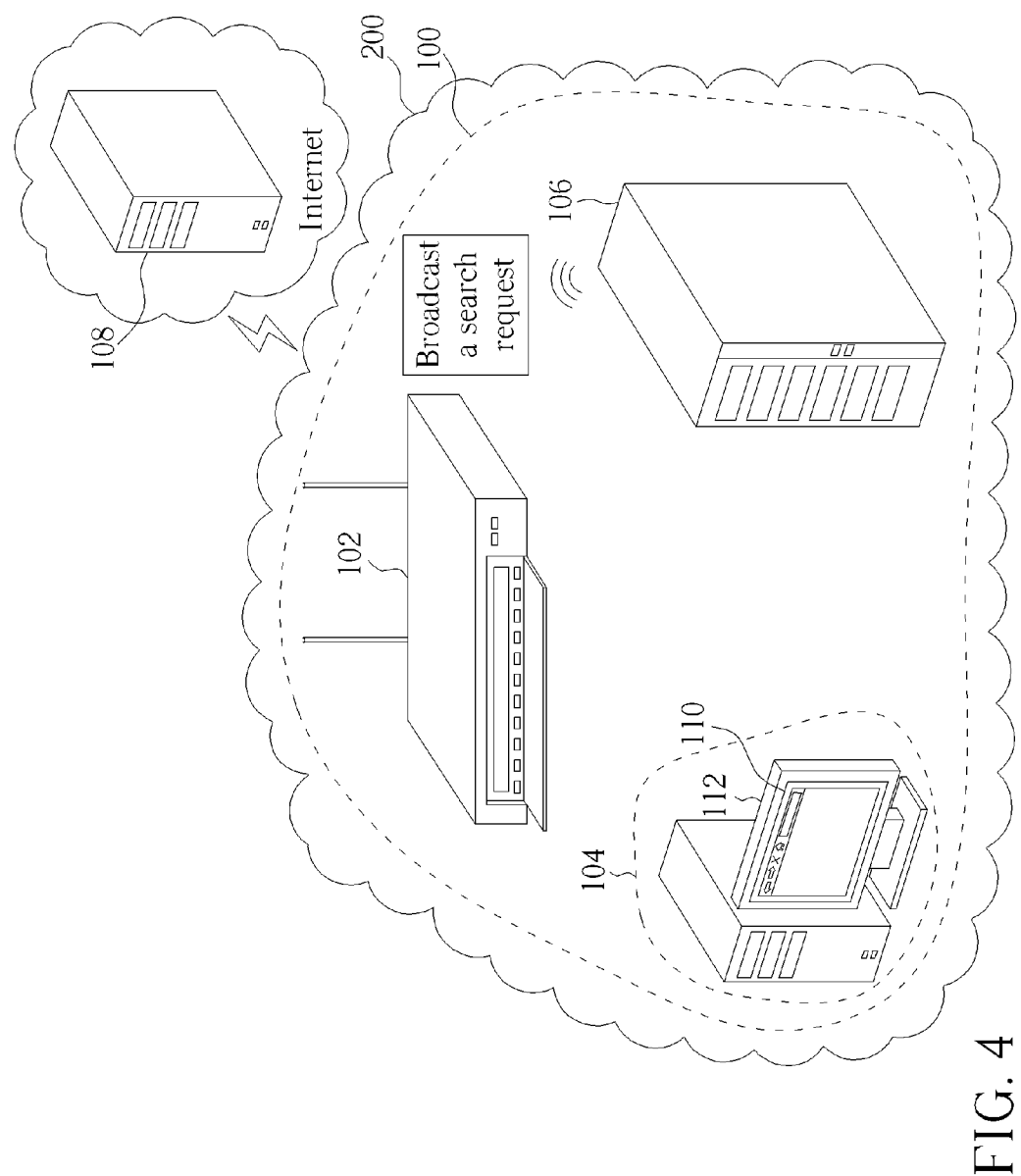
FIG. 4 is a diagram illustrating the first slave utilizing the first predefined protocol to broadcast the search request on the internal network system.

Then, the first slave 106 (the search agent) can utilize a first predefined protocol (e.g. User Datagram Protocol (UDP) or Address Resolution Protocol (ARP)) to broadcast a search request on the internal network system 100 to search for other slaves with unknown IP addresses (as shown in FIG. 4). But, the present invention is not limited to the first predefined protocol being User Datagram Protocol or Address Resolution Protocol. That is to say, the first predefined protocol should be able to transmit packets on the internal network system 100.

Figure 5:
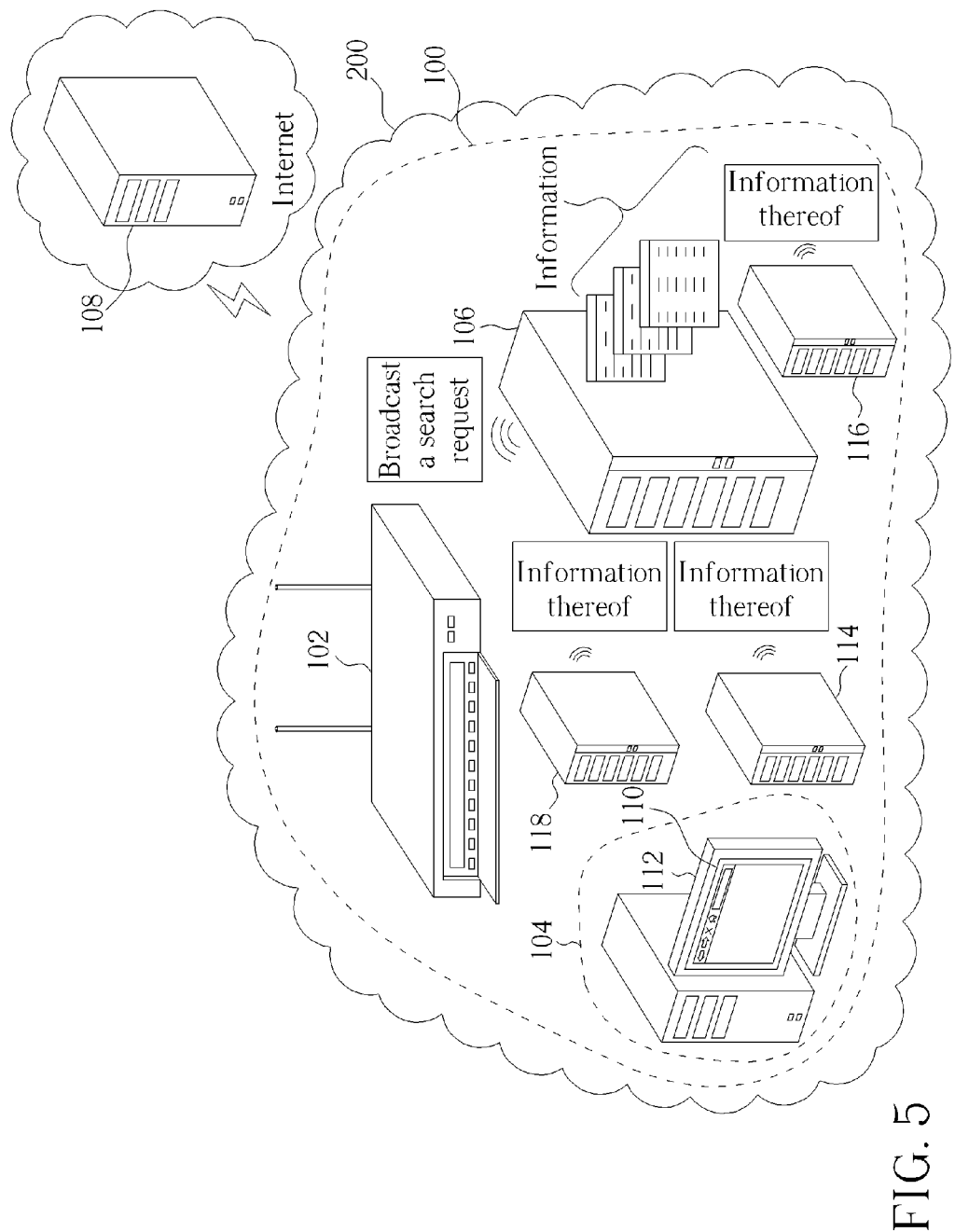
FIG. 5 is a diagram illustrating other slaves utilizing the second predefined protocol to respond information thereof on the internal network system.

After the other slaves existing on the internal network system 100 receive the search request sent by the first slave 106 (as shown in FIG. 5) partial slaves (slaves 114, 116, and 118) of the other slaves can utilize a second predefined protocol (e.g. User Datagram Protocol or Address Resolution Protocol) to respond information thereof on the internal network system 100 (because some slaves of the other slaves may utilize the second predefined protocol to broadcast information thereof outside a predetermined time, the first slave 106 may not receive information corresponding to all of the other slaves), where the first predefined protocol is the same as the second predefined protocol. But, in another embodiment of the present invention, the first predefined protocol is different from the second predefined protocol. In addition, the present invention is not limited to the slaves 114, 116, and 118 of the other slaves utilizing the second predefined protocol to respond the information thereof on the internal network system 100. Therefore, the first slave 106 can receive the information corresponding to the slaves 114, 116, and 118 of the other slaves within the predetermined time. Of course, each slave of the other slaves on the internal network system 100 can also receive information corresponding to the other slaves except information therefore, but they do not respond to the information corresponding to the other slaves.

Figure 6:
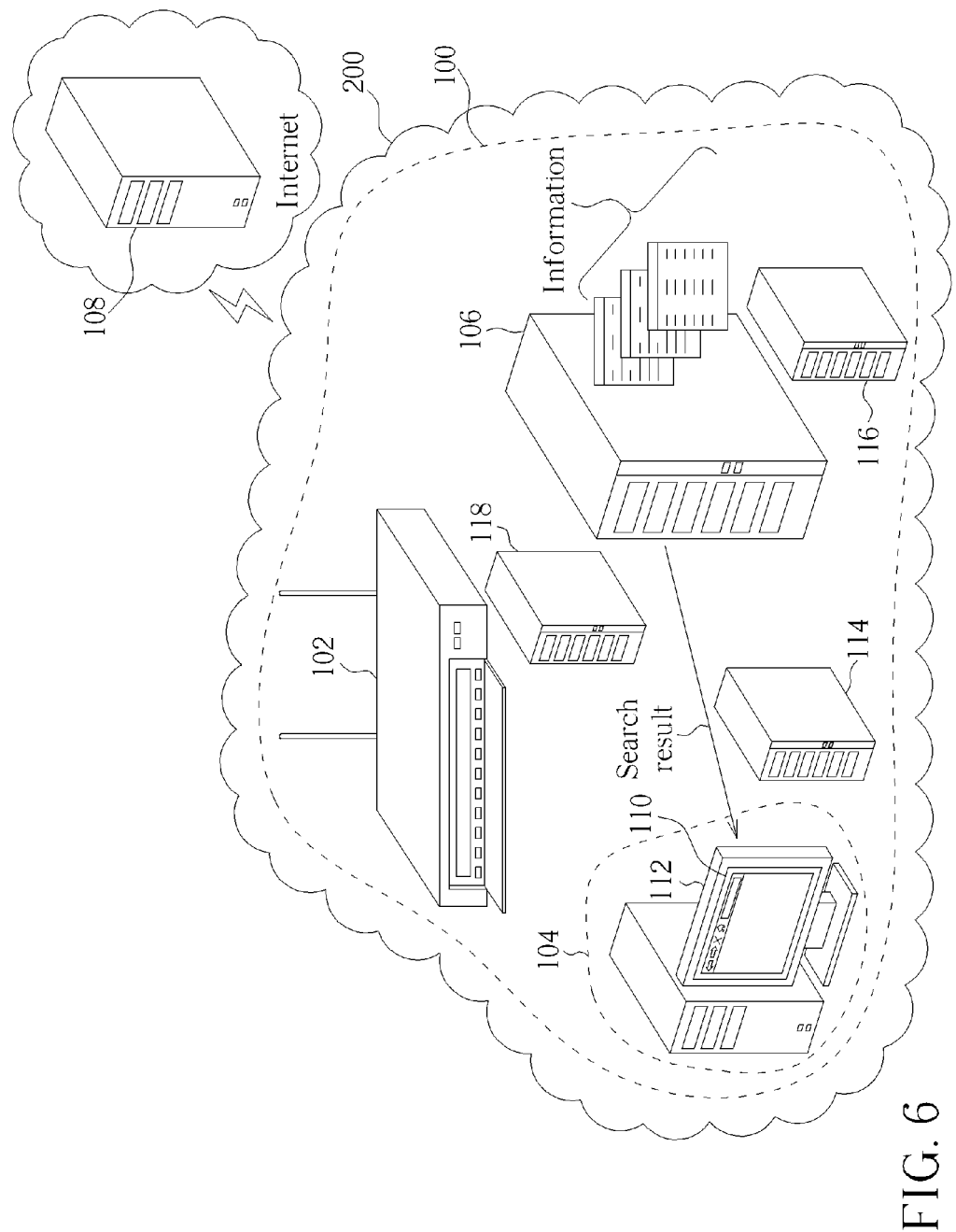
FIG. 6 is a diagram illustrating the first slave transmitting a search result of the information corresponding to the other slaves on the internal network system to the host through the cross site Asynchronous JavaScript and XML.

After the first slave 106 receives the information corresponding to the slaves 114, 116, and 118 of the other slaves within the predetermined time, the first slave 106 can transmit a search result of the information corresponding to the slaves 114, 116, and 118 of the other slaves on the internal network system 100 to the host 104 through the cross site Asynchronous JavaScript and XML (as shown in FIG. 6).

Figure 7:
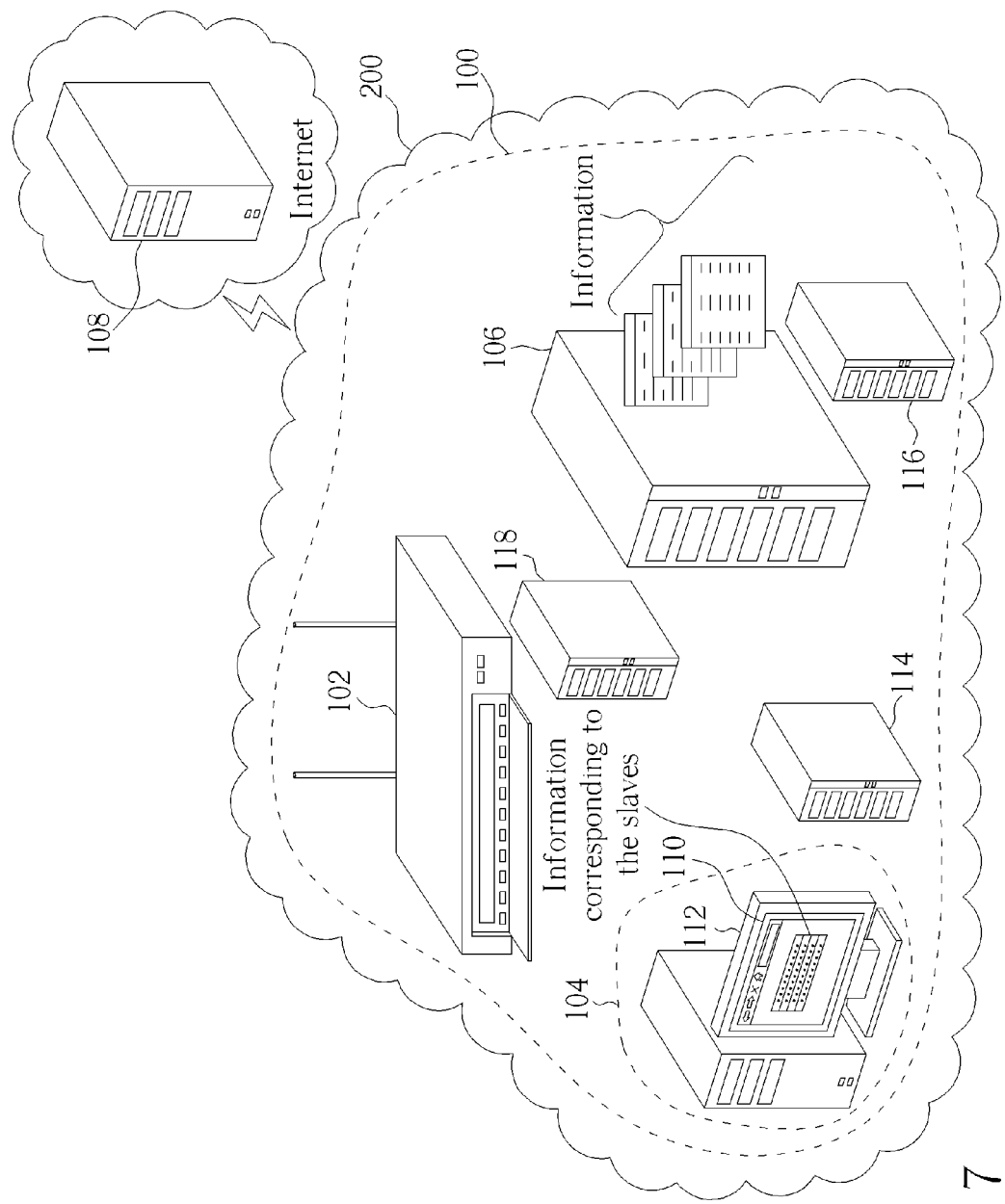
FIG. 7 is a diagram illustrating the user viewing the information corresponding to the slaves on the local area network through the window box displayed on the display of the host.

Therefore, the user can view the information corresponding to the slaves 114, 116, and 118 of the other slaves on the internal network system 100 through the window box 110 displayed on the display 112 of the host 104 (as shown in FIG. 7), and utilize the host 104 to execute predetermined operations on the slaves 114, 116, 118, and 106. For example, when the slaves 114, 116, 118, and 106 are storage devices, the host 104 can store data in the slaves 114, 116, 118, and 106; when the slaves 114, 116, 118, and 106 are IP cameras, the host 104 can set daily monitoring periods to the slaves 114, 116, 118, and 106.

In another embodiment of the present invention, the host 104 can utilize the predetermined tools built in the operating system (e.g. Universal Plug and Play (UPNP) and the web browser, Web Services Dynamic Discovery (WS-Discovery) and the web browser, or Bonjour and the web browser) to find the first slave 106 on the internal network system 100. Then, the host 104 can obtain the window box 110 from the first slave 106 (different from the host 104 obtaining the window box 110 from the predetermined server 108 shown in FIG. 2) through Universal Plug and Play and the web browser, Web Services Dynamic Discovery and the web browser, or Bonjour and the web browser. Further, after the host 104 obtains the window box 110 from the first slave 106 and utilizes Asynchronous JavaScript and XML built in the operating system of the host 104 to directly query the first slave 106 through the hostname (e.g. the NetBIOS name) of the first slave 106, subsequent operational principles of the first slave 106 and the other slaves on the internal network system 100 can be referred to FIG. 3 to FIG. 7, so further description thereof is omitted for simplicity.

In another embodiment of the present invention, the host 104 can connect to a predetermined port of the first slave 106, so the host 104 can also obtain the window box 110 from the first slave 106 through the predetermined port and utilize Asynchronous JavaScript and XML built in the operating system of the host 104 to directly query the first slave 106 through the hostname (e.g. the NetBIOS name) of the first slave 106. In addition, after the host 104 obtains the window box 110 from the first slave 106 and utilizes Asynchronous JavaScript and XML built in the operating system of the host 104 to directly query the first slave 106 through the hostname (e.g. the NetBIOS name) of the first slave 106, subsequent operational principles of the first slave 106 and the other slaves on the internal network system 100 can be referred to FIG. 3 to FIG. 7, so further description thereof is omitted for simplicity.

In addition, the predetermined tool of the present invention is not limited to the above mentioned predetermined tools. Therefore, any predetermined tool built in Windows, MAC, Linux, iPhone OS, or Android in which the first slave 106 can act as a search agent falls within the scope of the present invention.

Figure 8:
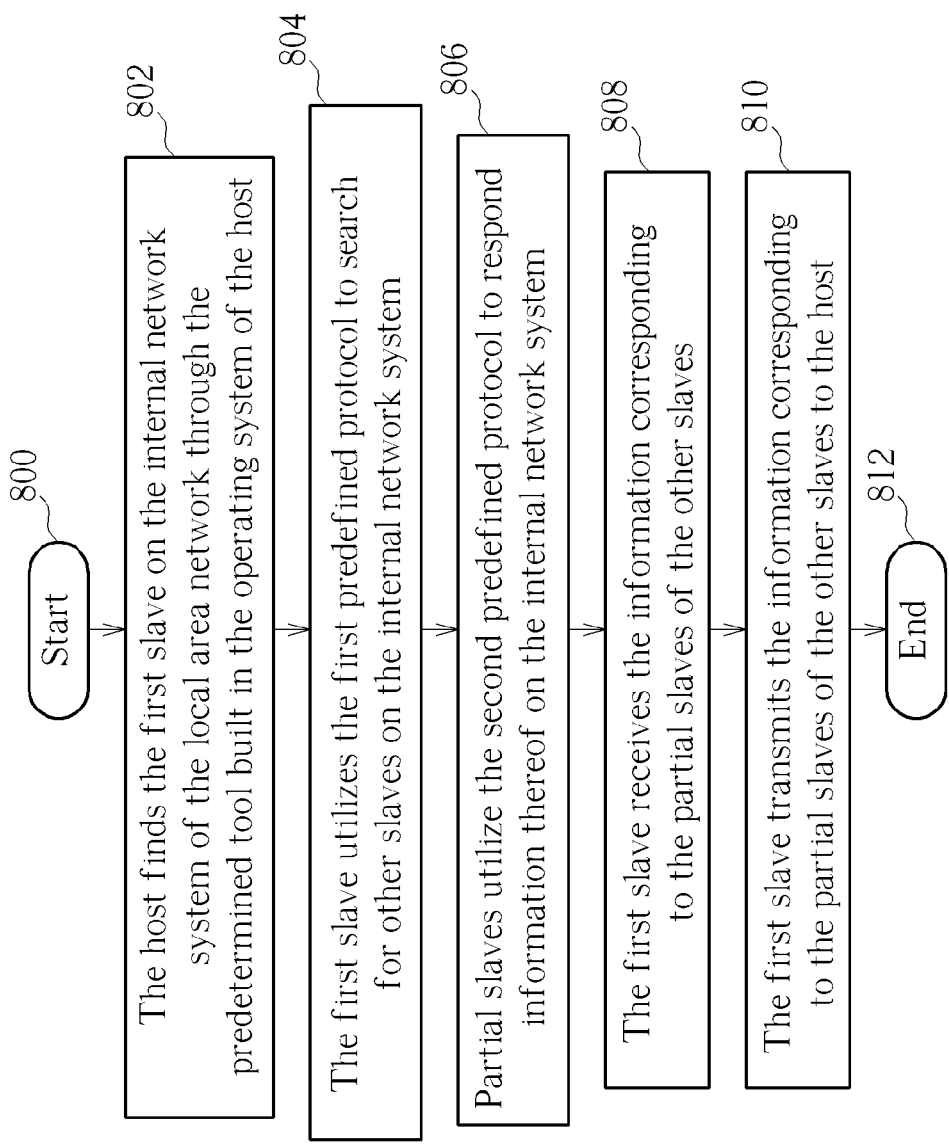
FIG. 8 is a flowchart illustrating a method of communication in an internal network system on a local area network according to another embodiment.

Please refer to FIG. 1 to FIG. 8. FIG. 8 is a flowchart illustrating a method of communication in an internal network system on a local area network according to another embodiment. The method in FIG. 8 is illustrated using the internal network system 100 in FIG. 1. Detailed steps are as follows:

Step 800: Start.

Step 802: The host 104 finds the first slave 106 on the internal network system 100 of the local area network 200 through the predetermined tool built in the operating system of the host 104.

Step 804: The first slave 106 utilizes the first predefined protocol to search for other slaves on the internal network system 100.

Step 806: Partial slaves utilize the second predefined protocol to respond information thereof on the internal network system 100.

Step 808: The first slave 106 receives the information corresponding to the partial slaves of the other slaves.

Step 810: The first slave 106 transmits the information corresponding to the partial slaves of the other slaves to the host 104.

Step 812: End.

In Step 802, when the host 104 starts to find the first slave 106 on the internal network system 100, the host 104 first utilizes the web browser of the host 104 to connect to the predetermined server 108 on the Internet through the router 102. Meanwhile, the web browser of the host 104 can obtain the window box 110 from the predetermined server 108, so the user can view the window box 110 displayed on the display 112 of the host 104. Meanwhile, the user can not view any information displayed on the window box 110 (as shown in FIG. 2).

After the host 104 obtains the window box 110, the host 104 can utilize cross site Asynchronous JavaScript and XML (Ajax) built in the operating system of the host 104 to query the first slave 106 on the internal network system 100 through the hostname (e.g. the NetBIOS name) of the first slave 106, where the operating system can include Windows, MAC, Linux, iPhone OS, or Android. Therefore, if the first slave 106 exists on the internal network system 100, the host 104 can find the first slave 106 and sets the first slave 106 to be the search agent (as shown in FIG. 3). If there are a plurality of slaves (the plurality of slaves have the same hostname) existing on the internal network system 100, the host 104 can still only set one (e.g. the first slave 106) of the plurality of slaves to be a search agent.

In Step 804, the first slave 106 (the search agent) can utilize the first predefined protocol (e.g. User Datagram Protocol or Address Resolution Protocol) to broadcast a search request on the internal network system 100 to search for other slaves with unknown IP addresses (as shown in FIG. 4). But, the present invention is not limited to the first predefined protocol being User Datagram Protocol or Address Resolution Protocol. That is to say, the first predefined protocol should be able to transmit packets on the internal network system 100.

In Step 806, after the other slaves existing on the internal network system 100 receive the search request sent by the first slave 106 (as shown in FIG. 5), partial slaves (e.g. the slaves 114, 116, and 118) of the other slaves can utilize the second predefined protocol (e.g. User Datagram Protocol or Address Resolution Protocol) to respond information thereof on the internal network system 100 (because some slaves of the other slaves may utilize the User Datagram Protocol to broadcast information thereof outside a predetermined time, the first slave 106 may not receive information corresponding to all of the other slaves), where the first predefined protocol is the same as the second predefined protocol. But, in another embodiment of the present invention, the first predefined protocol is different from the second predefined protocol. In addition, the present invention is not limited to the slaves 114, 116, and 118 of the other slaves utilizing the second predefined protocol to respond the information thereof on the internal network system 100.

Therefore, in Step 808, the first slave 106 can receive information corresponding to the slaves 114, 116, and 118 of the other slaves within the predetermined time. Of course, each slave of the other slaves on the internal network system 100 can also receive information corresponding to the other slaves except information thereof, but they do not respond to the information corresponding to the other slaves.

In Step 810, after the first slave 106 receives the information corresponding to the slaves 114, 116, and 118 of the other slaves within the predetermined time, the first slave 106 can transmit a search result of the information corresponding to the slaves 114, 116, and 118 of the other slaves on the internal network system 100 to the host 104 through the cross site Asynchronous JavaScript and XML (as shown in FIG. 6).

Therefore, the user can view the information corresponding to the slaves 114, 116, and 118 of the other slaves on the internal network system 100 through the window box 110 displayed on the display 112 of the host 104 (as shown in FIG. 7), and utilize the host 104 to execute predetermined operations on the slaves 114, 116, 118, and 106. For example, when the slaves 114, 116, 118, and 106 are storage devices, the host 104 can store data in the slaves 114, 116, 118, and 106; when the slaves 114, 116, 118, and 106 are IP cameras, the host 104 can set daily monitoring periods to the slaves 114, 116, 118, and 106.

Further, take another embodiment of the present invention as an example. In Step 802, the host 104 can utilize the predetermined tools built in the operating system (e.g. Universal Plug and Play and the web browser, Web Services Dynamic Discovery and the web browser, or Bonjour and the web browser) to find the first slave 106 on the internal network system 100. Then, the host 104 can obtain the window box 110 from the first slave 106 (different from the host 104 obtaining the window box 110 from the predetermined server 108 shown in FIG. 2) through Universal Plug and Play and the web browser, Web Services Dynamic Discovery and the web browser, or Bonjour and the web browser.

Further, after the host 104 obtains the window box 110 from the first slave 106 and utilizes Asynchronous JavaScript and XML built in the operating system of the host 104 to directly query the first slave 106, subsequent operational principles of the first slave 106 and the other slaves on the internal network system 100 can be referred to FIG. 3 to FIG. 7, so further description thereof is omitted for simplicity.

Further, take another embodiment of the present invention as an example. In Step 802, the host 104 can connect to a predetermined port of the first slave 106, so the host 104 can also obtain the window box 110 from the first slave 106 through the predetermined port and utilize Asynchronous JavaScript and XML built in the operating system of the host 104 to directly query the first slave 106 through the hostname of the first slave 106. In addition, after the host 104 obtains the window box 110 from the first slave 106 and directly queries the first slave 106, subsequent operational principles of the first slave 106 and the other slaves on the internal network system 100 can be referred to FIG. 3 to FIG. 7, so further description thereof is omitted for simplicity.

To sum up, the internal network system on the local area network and the method of communication in the internal network system on the local area network utilize the host not installed any additional software to find a search agent on the internal network system through a hostname. If the host can find one search agent on the internal network system, the search agent can help the host to find other slaves on the internal network system. Therefore, compared to the prior art, because the host does not need any additional software installed for searching slaves on the internal network system except a web browser and original software built in the operating system of the host, the present invention is convenient and friendly for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of communication in an internal network system on a local area network, the internal network system comprising a router and a host, the method comprising:
    the host utilizing a web browser thereof to communicate with a predetermined server located on the Internet through the router to obtain a window box from the predetermined server;
    the host utilizing a cross site Asynchronous JavaScript and Extensible Markup Language to broadcast a query on the internal network system after the host obtains the window box, wherein the query comprises information of a hostname;
    the host utilizing the window box to find a first slave after the first slave responds to the query through the window box according to the hostname, wherein the first slave exists in the internal network system, the first slave has the hostname, the host utilizes the window box to establish communication with the predetermined server and the first slave, and the first slave is an electronic apparatus; and
    the host setting the first slave to be a search agent after the host finds the first slave, wherein the first slave broadcasts a search request on the internal network system to find other slaves existing in the internal network system after the host sets the first slave to be the search agent, wherein the IP addresses of the other slaves are unknown to the host before the first slave broadcasts the search request.

2. The method of claim 1, wherein the web browser is built in an operating system of the host.

3. The method of claim 1, wherein the first slave utilizes a first predefined protocol to search for a second slave, and transmits the information of the second slave to the host after receiving the information of the second slave, and the second slave utilizes a second predefined protocol to respond information of the second slave.

4. The method of claim 1, wherein the first slave has the hostname before the first slave is shipped.

5. The method of claim 3, wherein the host, the first slave and the second slave are located on the local area network.

6. The method of claim 3, wherein the first predefined protocol and the second predefined protocol include User Datagram Protocol (UDP) or Address Resolution Protocol (ARP).

7. The method of claim 3, wherein the first predefined protocol is the same as the second predefined protocol.

8. An internal network system on a local area network, the internal network system comprising:
    a router; and
    a host for utilizing a web browser thereof to communicate with a predetermined server located on the Internet through the router to obtain a window box from the predetermined server, utilizing a cross site Asynchronous JavaScript and Extensible Markup Language to broadcast a query on the internal network system, wherein the query comprises information of a hostname and a first slave responds to the query through the window box according to the hostname, utilizing the window box to find the first slave according to the hostname, and setting the first slave to be a search agent after the host finds the first slave, wherein the first slave broadcasts a search request on the internal network system to find other slaves existing in the internal network system after the host sets the first slave to be the search agent, wherein the IP addresses of the other slaves are unknown to the host before the first slave broadcasts the search request and the first slave exists in the internal network system;
    wherein the first slave has the hostname, the host utilizes the window box to establish communication with the predetermined server and the first slave, and the first slave is an electronic apparatus.

9. The internal network system of claim 8, wherein the web browser is built in an operating system of the host.

10. The internal network system of claim 8, wherein the first slave utilizes a first predefined protocol to search for a second slave, and transmits the information of the second slave to the host after receiving the information of the second slave, and the second slave utilizes a second predefined protocol to respond information of the second slave.

11. The internal network system of claim 8, wherein the first slave has the hostname before the first slave is shipped.

12. The internal network system of claim 10, wherein the host, the first slave and the second slave are located on the local area network.

13. The internal network system of claim 10, wherein the first predefined protocol and the second predefined protocol include User Datagram Protocol or Address Resolution Protocol.

14. The internal network system of claim 10, wherein the first predefined protocol is the same as the second predefined protocol.

* * * * *